SIGNAL TRANSFER IN CYCLIC STORAGES

INVENTOR
GERHARD DIRKS
BY Joseph Weingarten
ATTORNEY

INVENTOR
GERHARD DIRKS
BY Joseph Weingarten
ATTORNEY

INVENTOR
GERHARD DIRKS
BY Joseph Weingarten
ATTORNEY

United States Patent Office 3,088,102
Patented Apr. 30, 1963

3,088,102

SIGNAL TRANSFER IN CYCLIC STORAGES

Gerhard Dirks, Frankfurt am Main, Germany
(12120 Edgecliff Place, Los Altos Hills, Calif.)

Filed Oct. 31, 1958, Ser. No. 771,127
Claims priority, application Great Britain Nov. 9, 1957
27 Claims. (Cl. 340—174.1)

This invention relates to cyclically operable magnetic data storage devices, and more particularly to arrangements for transferring stored information from one storage location to another.

Cyclically operating signal storage devices in the form of magnetic drums, discs, etc. are well known. In general such a storage device is provided with a plurality of storage tracks, each of which consists of a plurality of signal storage locations. A magnetic reading and writing head is associated with each track, so that it is possible by the use of suitable signal gating arrangements to transfer a signal from a storage location which is being read in one track to the storage location which is opposite the writing head in another track. However, if it is desired to transfer the signal to a different storage location the signal must be read into a buffer store and held there until the desired location becomes available to the writing head. A complex control and gating circuit is necessary if it is possible to transfer a signal from a given storage location to any selected one of a number of other storage locations. If the signals from blocks of storage locations are to be transferred in this way then a correspondingly large buffer store is also required. It will be appreciated that the same difficulties arise in providing the converse mode of transfer, that is, in which a signal from any one of a number of storage locations may be selected for transfer to a given location.

It is an object of the invention, to provide an improved arrangement for the selective transfer of signals between the storage locations of a cyclically operating magnetic store.

It is another object of the invention to provide a cyclically operating data storage arrangement in which a signal from any one of a number of storage locations may be transferred to a desired location without the necessity for providing storage for the signals from such locations.

It is a further object of the invention to provide a cyclically operating data storage arrangement in which a signal may be transferred from a given storage location to any desired one of a number of other storage locations without the necessity for storing that signal.

According to the invention cyclically operable data storage apparatus with first and second data storage tracks for magnetically recorded signals, each track being divided into a plurality of character storage positions, includes a first magnetic transducing head co-operating with the first track, a plurality of second magnetic transducing heads co-operating with the second track and spaced apart along it, first switching means connected to the second magnetic heads, signal gating means connecting the switching means to the first magnetic head, means for generating a plurality of differently timed timing pulse trains, second switching means for selectively applying the timing pulse trains to the gating means, and transfer control means adapted to operate the first and second switching means to complete a signal transfer path between a selected second magnetic head and the first magnetic head at pre-determined timing to effect transfer of signals from a selected character positions of one track to a selected character position of the other track.

The invention will now be described, by way of example, with reference to the accompanying drawings, in which.

Figure 1:
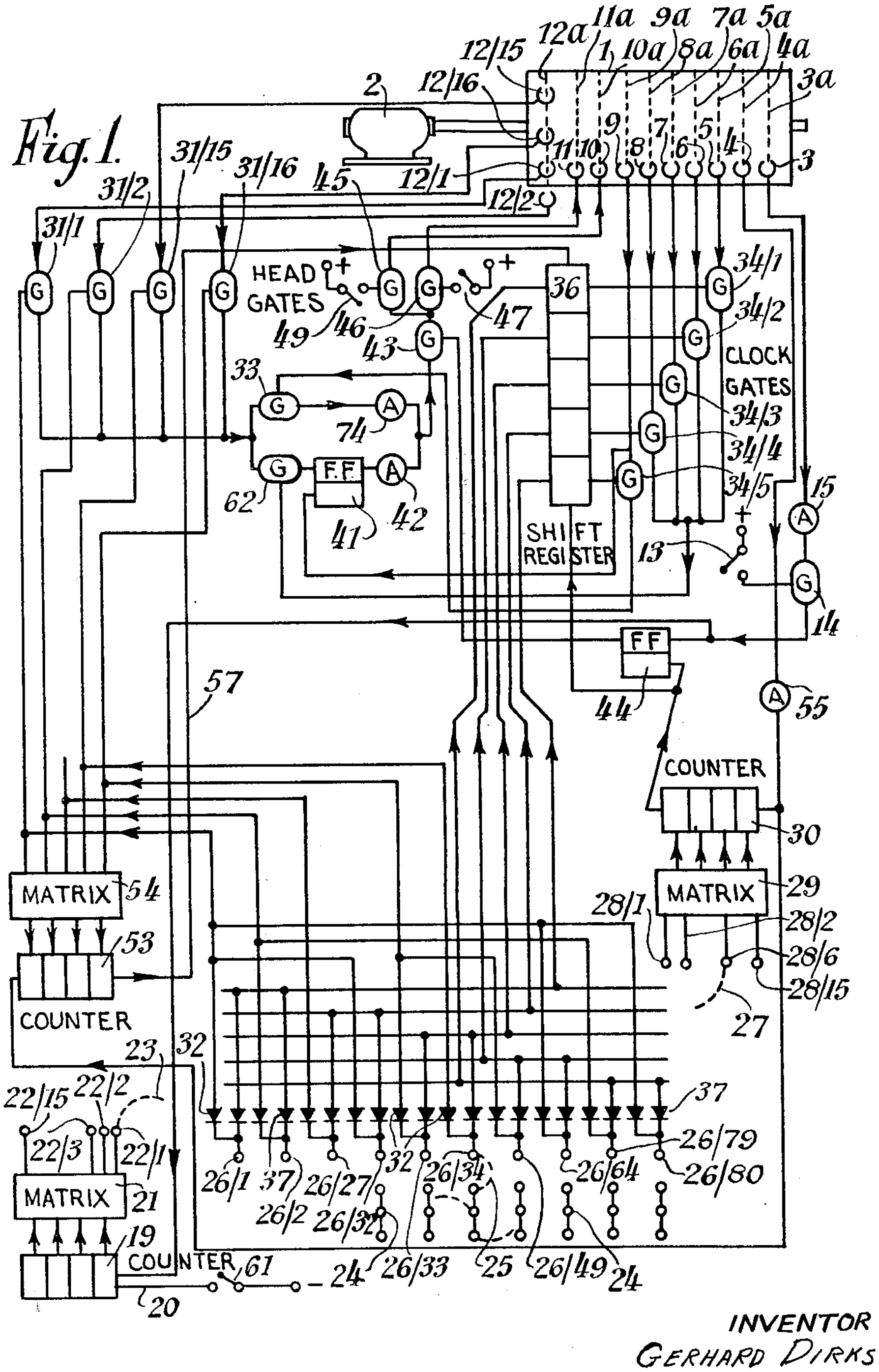
FIGURE 1 is a block schematic diagram of a data storage arrangement employing a magnetic drum.

Information is stored as signals on the magnetisable surface of a drum 1 (FIGURE 1). The drum 1 is rotated continuously by an electric motor 2. The drum 1 has ten circumferential signal tracks 3*a* to 12*a*. The tracks 3*a* to 9*a* have signals permanently recorded therein and are used for control purposes. Magnetic reading heads 3 to 9 are associated with the signal tracks 3*a* to 9*a* respectively. The track 12*a* has information signals recorded therein and these signals may be sensed by sixteen magnetic reading heads 12. The heads 12 are spaced equidistantly round the periphery of the drum 1. For the sake of clarity only four of the heads 12/1, 12/2, 12/15 and 12/16 are shown in FIGURE 1. Signals sensed by the heads 12 may be recorded in the tracks 10*a* or 11*a* by recording heads 10 and 11 respectively.

Figure 2:
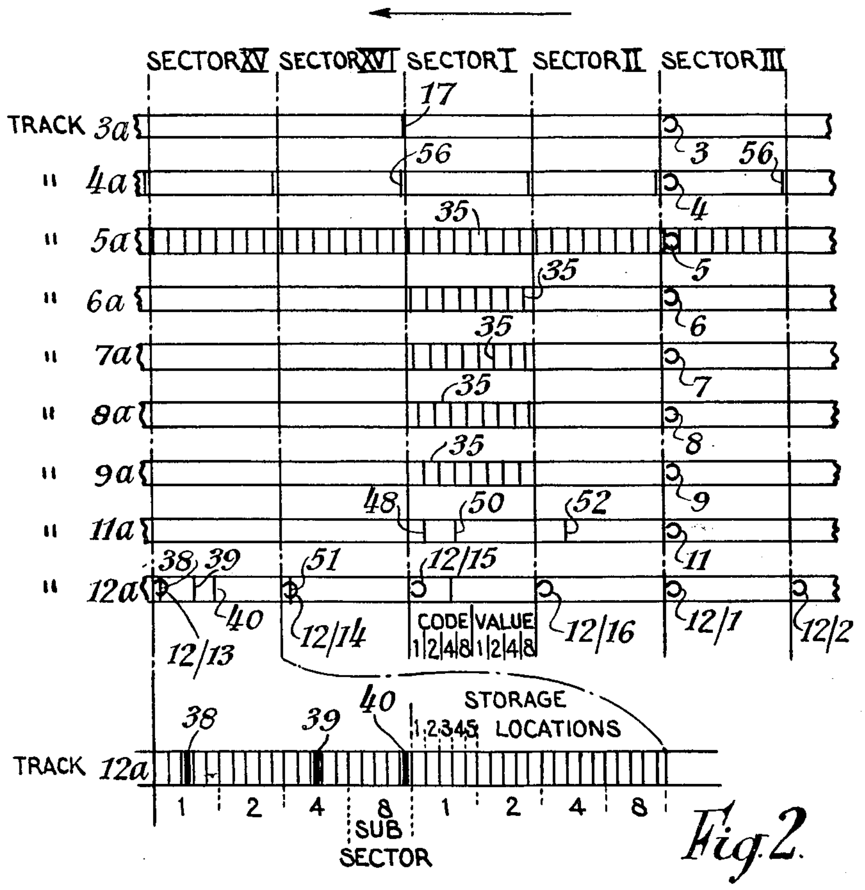
FIGURE 2 illustrates the relative positioning of signals recorded in various tracks of the magnetic drum and of the magnetic heads associated therewith.

Each track of the drum 1 is divided up into sixteen sectors of equal length, five of such sectors being illustrated in more detail in FIGURE 2. Each sector of the track 12*a* is divided into two groups of four sub-sectors each. Each sub-sector of a group corresponds to one of the binary code values 1, 2, 4 or 8 as indicated by the subdivisions of sector I reference "Code Value." Each sub-sector is divided into five storage locations. Thus the "1" valve sub-sector may contain up to five signals each representing the "1" code component of a different digit.

This form of information track in which signals representing the code components of different digits are interlaced, is described in more detail in my co-pending application Serial No. 771,126, filed Oct. 31, 1958, entitled "Transfer and Storage of Digital Data Signals." This application describes how such a track is produced by the successive sensing of the columns of a punched record card. The card is sensed eightieth column leading and the digits or characters represented by the holes in columns eighty to sixty-five are recorded in sectors I to XVI respectively. These signals are recorded in the first storage location of the various sub-sectors. In the next rotation of the drum 1, columns sixty-four to forty-nine of the card are recorded in the sectors I to XVI respectively, the signals being recorded in the second storage location of each sub-sector. The remaining columns on the card are recorded in a similar manner using the third, fourth and fifth storage locations of the sub-sectors. On the completion of recording, sector I of the track 12*a* has recorded therein signals representing the characters sensed from columns eighty, sixty-four, forty-eight, thirty-two and sixteen. Thus the characters are also interlaced in the track 12*a* in relation to the order in which they were sensed from the record card. The tracks 10*a* and 11*a* are divided into sub-sectors and storage locations in a similar manner to the track 12*a*.

To initiate a transfer of signals from the track 12*a* to one of the tracks 10*a* or 11*a*, a switch 13 is closed to render operative a gate 14. This gate allows pulses generated by the head 3 and amplified by a conventional reading amplifier 15 to be fed to the input of a four stage binary counter 19. The track 3*a* contains a single recorded signal 17 (FIGURE 2) at the start of sector I. As shown in FIGURE 2, the heads 3 to 11 and 12/1 lie on the same axial line and the drum rotates so that the sectors pass the heads in the direction indicated by the arrow. Consequently, as long as the gate 14 is operative, a pulse will be fed to the counter 19 each time sector I is about to pass beneath the heads 3 to 11 and 12/1.

The counter 19 is a conventional binary counter comprising four bistable trigger stages and has therefore a counting capacity of fifteen, the sixteenth condition corresponding to a count of zero and being known as the reset condition. The counter is stepped in the usual way by the pulses from the gate 14. Immediately prior to the operation of the switch 13, a reset switch 61 is momentarily closed to provide a negative pulse over line 20 to reset the counter to zero in the usual manner. Hence the pulse from the gate 14 causes the counter to register one. The four stages of the counter apply control potentials to a diode matrix 21, which has fifteen output terminals 22/1 to 22/15, of which four are shown in FIGURE 1. The matrix is wired to convert the combinational binary representations of the counter to energisation of the corresponding output terminal. Thus, with the counter registering one, a potential is applied through the matrix to the terminal 22/1. Each further pulse from the gate 14 will increase the value registered by the counter 19 by unity, so that the terminals 22/1, 22/2, 22/3 etc. will be energised in sequence. The use of a diode matrix for decoding the binary representations of the counter in this way is known. For example the use of a diode matrix in this manner is shown in an article entitled "The Selenium Rectifier in Digital Computer Circuits," by A. D. Booth and A. D. Holt in "Electronic Engineering" for August 1954. The sequential energisation of the matrix terminals 22 is used to control a series of signal transfers from the track **12*a***.

A plug connection 23 is made from the terminal 22/1 to one of a group of commoned plug sockets 24. A plug connection 25 is made from these commoned sockets to a plug socket 26/34. The socket 26/34 is one of a group of eighty sockets 26, only some of which are shown in FIGURE 1. The suffix numbers of the socket corresponds to the card column numbers of the card which is recorded in the track **12*a*. That is, eighty characters may be stored in the track 12*a*** and the suffix numbers correspond to the sequence in which the characters were sensed for recording, starting with the eightieth character.

The counter 19 will register one after the first pulse has passed through the gate 14 and the socket 22/1 will be made live. This will control the first transfer in the manner described below in detail. Further plug connections (not shown) may be made between the sockets 22 and 26, via the sockets 24, to control subsequent transfers. For example, a connection may be made between sockets 22/2 and 26/80, so that the second transfer will start with the eightieth digit. The counter 19 receives one pulse per revolution of the drum, so that it may initiate a transfer on each revolution, the particular digits transferred being determined by the plug connections which have been made. Thus the counter acts as a sequential switch for controlling the programme of transfers represented by the plug connections.

The plug connection to the sockets 26 determines the character at which transfer is to start. Hence, in this case, the first character to be transferred will be the thirty-fourth character. The number of characters to be transferred is determined by a further plug connection 27 from the common sockets 24 to a plug socket 28/6. There are fifteen sockets 28, of which only some are shown in FIGURE 1. They are connected to the input lines of a diode matrix 29. This matrix has four output lines which are connected to the individual stages of a conventional four stage binary counter 30. The matrix is wired to convert energisation of one of the input lines, to an energisation of the output lines which represents the complement to fifteen in binary form of the suffix number of the input line. The output lines of the matrix are each connected to one stage of the counter 30 and these connections are such that a pulse derived from the matrix 19 and applied through the plugging to the input lines of the matrix 29 is passed to the appropriate output lines and forcibly sets the corresponding stages of the counter 30. Thus, with the input line 28/6 energised, the counter 30 will be set to register nine in binary (1001), which is the complement to fifteen of six. The suffix number of the sockets 28 indicates the number of characters to be transferred, so that with the plug connections shown in FIGURE 1, six characters, starting with the thirty-fourth, i.e. characters thirty-four to twenty-nine inclusive, will be transferred.

When a group of characters is transferred to the tracks **10*a* or 11*a*, the first character to be transferred is always recorded in sector I. This ensures that the least significant character is recorded in sector I and thus facilitates subsequent processing of the transferred characters. The digits of two numbers may have any relative positioning in the track 12*a*, the positioning depending only on the particular columns in which they were recorded on the original record card. However, by appropriate plugging to the sockets 26, the two numbers may be transferred to the tracks 10*a* and 11*a***, with the least significant digit recorded in sector I in each case, so that these tracks may now be sensed and the resulting signals fed to an adding circuit to form the sum of the two numbers, for example.

To secure this re-positioning of the transferred signal, the original signal to be transferred first must be sensed at the same time as sector I is passing the recording head 11, if the transfer is to take place into track **11*a*. From the previous description of the interlacing of the characters, it will be appreciated that the thirty-fourth character is recorded in sector XV of track 12*a*. It will be seen from FIGURE 2 that sector XV will pass the reading head 12/15 at the same time as sector I passes the recording head 11. The desired re-positioning will be effected by rendering the head 12/15 effective to control the head 11**.

It will be appreciated that for the purpose of reading and recording signals on the drum all the heads are connected to appropriate reading and recording amplifiers in the usual way as shown for the heads 3 and 4. However, for the sake of clarity these amplifiers are not shown for the remaining heads since they are unnecessary to the understanding of the present invention.

Each head 12 is connected to the input of a head gate 31, of which only four are shown in FIGURE 1. Each of the sockets 26 is connected through a diode 32 to the control input of one of the head gates. The connections are such that a character plug socket 26 controls signals from that head 12 which corresponds to the sector in which the character is recorded in the track **12*a*. For example, the eightieth character is recorded in sector I, so that the socket 26/80 is connected to the gate 31/1 which controls signals from the head 12/1, whereas the thirty-fourth character is recorded in sector XV, so that the socket 26/34 is connected to the gate 31/15, which controls signals from the head 12/15. The outputs of the gates 31 are connected in common to the inputs of the two gates 62 and 33**.

It has already been noted that signals representing five different characters are recorded in each sector of the track **12*a*. It is also necessary, therefore, to select the required character in each sector for transfer. This is effected by providing five differently timed clock pulse trains, which are individually selectable by five clock gates 34/1 to 34/5. These gates receive signals from the heads 5 to 9, respectively. The tracks 5*a* to 9*a* have eight signals 35 permanently recorded in each sector of each track. For clarity, these signals are shown only in sector I of tracks 6*a* to 9*a*, of FIGURE 2. The position of the signals 35 is different in the different tracks. The signals in the track 5*a* correspond in position to the first storage location of each subsector of the track 12*a*, the signals in the track 6*a*** to the second storage location and so on. If the signals from a particular sector of track 12*a* are gated by the appropriate clock pulse train, the resultant output will represent a selected character from that sector.

The clock gates 34 are controlled by the individual stages of a five stage shifting register 36 of conventional form and comprising five bistable trigger stages. Each of the plug sockets 26 is connected through a diode 37 to one of the stages of the shifting register 36. The thirty-fourth character is recorded in the third storage location of each sub-sector of sector XV, so that the socket 26/34 is connected to that stage of the register 36 which controls the clock gate 34/3. The application of a potential to the socket 26/34 is transmitted through the diode 37 to switch on the third stage of the register which renders operative the gate 34/3. This gate in conjunction with the head 7 provides a train of clock pulses which occur at the times when the third storage location of each sub-sector is being sensed by the heads 12.

In this embodiment of the invention, the transferred signals are always recorded in the fifth storage location of each sub-sector of the tracks 10*a* or 11*a*. For this reason, it is necessary to re-synchronise the signals sensed from the track 12*a* unless they occur in the fifth storage location.

The outputs from the heads 34/1 to 34/4 are commoned and are connected to the gate 62. The output from the gate 34/5 is connected to the gate 33.

To recapitulate, after the switch 13 was closed, a pulse was passed by the gate 14 just before the start of sector I passed the head 11. This pulse operated the counter 19 to apply a potential to the socket 26/34 through the indicated plug connections. This potential was applied through the diode 32 to render operative the gate 31/15 and through the diode 37 to the register 36 to render the gate 34/3 operative. Thus as sector I of track 11*a* begins to pass beneath the head 11, signals from the head 12/15 are fed to the gates 62 and 33, and clock signals from the head 7 are fed to the gate 62. The head 12/15 is sensing sector XV at this time.

Recorded signals 38, 39 and 40 (FIGURE 2) in track 12*a* induce signals in the head 12/15 as sector XV passes beneath the head. The signal 38 is recorded in the third storage location of the first sub-sector, so that it will occur at the same time as a clock pulse from the gate 34/3. The gate 62 will produce an output pulse which is applied to one input of a bi-stable flip-flop 41 of known form. This pulse switches on the flip-flop. Shortly after, the flip-flop receives a pulse on the other input from the head 9. This pulse occurs at the time when the fifth storage location of the sub-sector containing the signal 38 is being sensed by the head 12/15. The flip-flop 41 is switched off by this pulse and produces a pulse which is fed via an amplifier 42 to the input of a gate 43. This gate is controlled by a bi-stable flip-flop 44, similar to the flip-flop 41. The flip-flop 44 was switched on at the beginning of the transfer operation by the output of the gate 14 in response to the first pulse derived from the track 3*a* by the head 3, and in its on condition the trigger 44 conditions the gate 43 to pass the pulse from the amplifier 42. The pulse is therefore passed by the gate 43 to the input of two gates 45 and 46, which are conditioned by the operation of switches 47 or 49 respectively. If the switch 47 is closed, the gate 46 is operative to pass the pulse to the recording head 11, which is thereby energised to record a signal 48 in track 11*a*. If the switch 49 is closed instead, the pulse will be fed through the gate 45 to the recording head 10. The switches 47 and 49 thus determine which of the tracks 10*a* or 11*a* is to be used to record the data transferred.

The head 12/15 is displaced from the head 11 by a circumferential distance equal to two sectors. The signal 48 will be recorded therefore in a sub-sector of sector I corresponding to the sub-sector occupied by the signal 38, but it has been recorded in sector I instead of sector XV. The flip-flop 41 was reset by a pulse from the head 9, so that the signal 48 is recorded in the fifth, instead of the third storage location in its sub-sector. Thus the signal 48 has the same value as the signal 38, but the storage location and the sector location have been changed.

The signal 39, which is also recorded in the third storage location will cause operation of the gate 62 in the manner already described and will produce recording of a corresponding signal 50 in track 11*a*. However, the signal 40 is in the fifth storage location of a sub-sector, so that the resulting signal applied to the gate 62 will not coincide with a clock pulse from the gate 34/3. The gate 62 will not produce an output and a signal will not be recorded in track 11*a*. The signal 51, recorded in the third storage location of a sub-sector of sector XVI, will produce recording of a signal 52 in the corresponding sub-sector of sector II of track 11*a* as the drum continues to pass beneath the heads. This signal 51 represents the thirty-third character.

The thirty-second character is recorded in sector I of track 12*a*, so that it will be sensed next by the head 12/15. However, it is recorded in the fourth storage locations of the sub-sectors of sector I. It is necessary to use the clock pulse train from the head 8 to select this character and the necessary switching is effected under control of a four stage binary counter 53, which is generally similar to the counter 30 and which is initially set in a similar manner by a diode matrix 54.

The potential which is applied from the sockets 26 to the head gates 31 is also applied to the input lines of the matrix 54. This matrix, however, is wired to produce on the output lines, which are connected to the stages of the counter 53, the binary equivalent of one less than the sector number of the head 12 which is selected. In the present case, the head 12/15 is selected by rendering operative the gate 31/15, so that the matrix output lines are energised to represent the value fourteen in binary (1110). The output lines of the matrix forcibly set the stages of the counter 53 in the same manner as the counter 30 is set.

The counter receives input pulses from the head 4 via an amplifier 55. The track 4*a* contains permanently recorded signals 56 (FIGURE 2) positioned at the end of each sector. At the beginning of the transfer, the head 4 is sensing the start of sector I, and the counter 53 is set to register fourteen by the matrix 53. The signal 56 at the end of sector I is sensed by the head 4 to generate a pulse which increases the counter registration to fifteen. In the same way, the signal 56 at the end of sector II returns the counter to zero, since it has a counting capacity of sixteen. The resetting of the highest stage of the counter generates a pulse which is applied over a line 57 as a shift pulse to the shift register 36. This pulse operates in the usual manner to shift the setting of the register from the third to the fourth stage, rendering the gates 34/3 and 34/4 inoperative and operative respectively. Hence, the gate 32 now receives clock pulses from the head 8 instead of from the head 7.

The end of sector pulses from the head 4 are also fed to the input of the counter 30, which it will be recalled, was set to register the complement of the number of characters to be transferred. The counter will receive a pulse at the end of each sector, that is, after the transfer of each character. Hence the counter will be returned to zero by a number of pulses equal to the required number of characters. The consequent resetting of the highest stage of the counter generates a pulse which is applied to an input of the flip-flop 44 to switch it off and thereby close the gate 43 and prevent any further signals being applied to the recording head 11. In this way only the required number of characters are transferred.

The pulse from the counter 30 is also applied to the shift register 36 to reset all the stages.

It has already been explained that the counter 19 receives one input pulse for each revolution of the drum 1, so that a transfer cycle similar to that already described may be carried out for each of fifteen drum revolutions. The characters selected for transfer on each cycle are determined by appropriate plug connections between the output terminals 22 and the sockets 26 and 28. Although only two recording tracks, the tracks 10*a* and 11*a*, have been shown, it will be appreciated that a multiplicity of such tracks are provided, each having an associated recording head and a control gate corresponding to the gates 45 and 46. The control lines of the gates 45 and 46 and the similar gates for the other recording tracks may be connected to plug sockets instead of the switches 47 and 49. Plug connections are then made between such sockets and the terminals 22, so that when a particular output line of the matrix 21 is energised a potential is applied to a selected control gate to render operative the required recording head.

In the example described, signals are transferred from the third and fourth storage locations in the sub-sectors of the track 12*a* and are recorded in the fifth location in the sub-sectors of the track 11*a*. If the signals to be transferred are in the fifth locations in the track 12*a* the re-timing of the signals under control of the flip-flop 41 is not necessary. Consequently, when the clock pulses from track 9*a* are selected to control the transfer by the setting of the fifth stage of the shifting register 36, the gate 34/5 passes output pulses directly to open gate 33. Thus the signals read by the selected head 12 are passed via amplifier 74 to the gate 43 without being changed in time.

Moreover, in the embodiment described, since the pulses derived from the track 9*a* are applied to gate 33 and trigger 41 recording always takes place in the fifth storage location of a sub-sector. If, however, it is desired to record the transferred signals in any selected storage locations, the gate 33 and the trigger 41 is fed with a clock pulse train derived from the commoned outputs of a set of five-gates similar to the gate 34. The gate required for a particular transfer is made operative under control of the potential available at the terminals 22.

Figure 3:
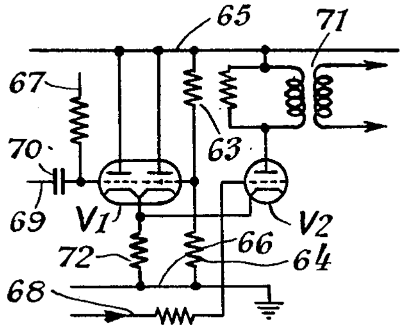
FIGURE 3 is a detailed circuit diagram of a gate circuit shown in block form in FIGURE 1.

The gates used throughout the embodiment are derived from the circuit shown in FIGURE 3, which shows in detail the circuit of the gate 43. The gate comprises a double triode V1 and a triode V2 having a common cathode resistor 72. The right hand side of V1 serves to stabilise the operating potential of the cathodes by virtue of a fixed potential applied to the grid from a potential divider consisting of resistors 63 and 64 connected between a positive supply line 65 and an earth line 66. The left hand grid of V1 is connected to a positive bias line 67 and this section of V1 is therefore normally conducting so that the common cathode potential is high. The grid of the triode V2 is controlled from the flip-flop 44 over a line 68, but the normal cathode potential is such that whatever the condition of the flip-flop, V2 does not conduct. Negative going pulses derived from the gate 33 or the flip-flop 41 respectively are applied over line 69 to the grid of the left-hand section of V1 via a capacitor 70. This section of V1 is therefore cut off and the cathode potential falls. Under these conditions, if the flip-flop 44 is switched on a positive potential is applied to the grid of the triode V2 over the line 59 and the triode V2 conducts.

An output pulse is then generated by means of a transformer 71, the primary winding of which is in the anode circuit of V2. It will be appreciated that the polarity of the output pulse is selected to suit the operating conditions of the succeeding apparatus. For example the gate 43 provides a negative-going pulse to the input line corresponding to 69 of the gates 45 and 46 but the gates 34 are required to produce positive-going signals to condition the gates 62 and 33. This required change of polarity is accomplished by reversing the connections of the secondary winding of the output transformer. Thus, the remaining gates with the exception of the gates 31 are similar to the gate 43. The gates 31 are modified as follows.

These gates are conditioned by negative-going signals applied through the diodes 32 and in consequence the signal applied to the input line corresponding to 68 in FIGURE 3 is first reversed in polarity by means of a conventional inverting stage before being applied to the control grid of the triode V2.

The amplifiers, such as 42, interposed in the input line of the gate 43 are of conventional form and are arranged to provide the required negative-going signals.

It will be appreciated that the track 12*a* need not take the form described above. For example, the number of sectors, sub-sectors, and storage locations in a sector may be made different to suit the amount of information to be recorded and the code by which the characters are represented. The control tracks are modified accordingly. In the simplest case, a single character is recorded in each sector, so that only a single clock track is required and the selection arrangements provided by the gates 34, the register 36, the counter 53 and the matrix 54 are not required.

The number of heads 12 may be reduced by utilising only those heads which are associated with the even numbered sectors, for example, and providing a conventional delay line circuit (FIGURE 4) for each head. For example, the head 12/2 is connected directly to the input of the gate 31/2 and via a delay circuit 73 to the input of the gate 31/1. This circuit provides a delay equal to the time required for one sector to pass beneath the head 12/2, so that the signals applied to the gate 31/1 will at the same time as if the gate had been fed directly by the head 12/1.

The selection of the heads 12 may be controlled by a marker signal recorded in another track. A counter is provided which receives the end of sector signals through a gate. The marker signal is recorded in the sector corresponding to the selector from which transfer is to start. When this marker signal is sensed, a signal is applied to switch a flip-flop which renders inoperative the gate controlling the input to the counter and renders operative a set of gates which allow the counter stages to control the input lines of a matrix similar to the matrix 21. The output lines of the matrix control the head gates 31. The flip-flop also controls a gate through which pulses are fed to the flip-flop 44 from the amplifier 14. This prevents the gate 43 being opened until the control flip-flop has been operated by the sensing of a marker signal. Thus the transfer takes place in the revolution following the sensing of the marker signal. If two or more characters are recorded in each sector, a second counter is provided to select the appropriate clock pulse train.

The arrangement described allows a signal to be transferred from any selected sector of the track 12*a* to a particular sector of the tracks 10*a* or 11*a*, that is, by selecting the desired head 12 and clock pulse train the chosen character is transferred to sector I of the tracks 10 or 11*a*, the character in the sequence is transferred to sector II and so on.

The reverse operation may be performed by interchanging the input and output connections of the circuit elements forming the signal transmission path between the heads 12 and the heads 10 and 11. The heads 10 and 11 then operate as reading heads and the heads 12 as recording heads. It will be appreciated that with these connections a signal sensed from the fifth storage location of a sub-sector of sector I of track 11*a*, for example, may be transferred to the corresponding sub-sector of any sector of track 12*a* by selecting the appropriate head and clock pulse train.

Figures 4, 5:
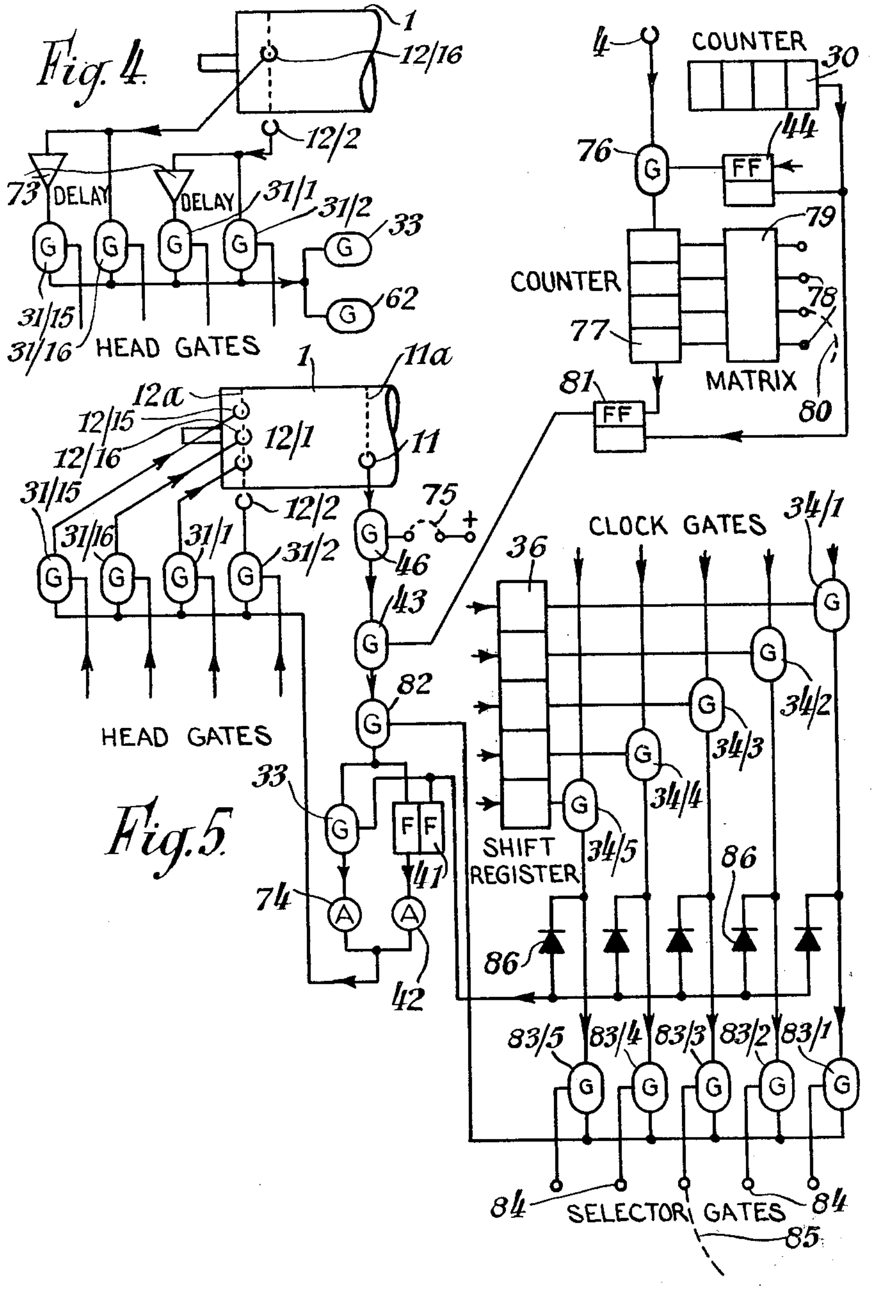
FIGURE 4 is a block diagram showing a modification of the signal sensing arrangement of FIGURE 1.
FIGURE 5 is a block diagram showing a further modification of the arrangement of FIGURE 1.

The modifications to the arrangement of FIGURE 1 are shown in FIGURE 5. The gate 46 is rendered operative by a plug connection 75. This allows all the signals sensed by the head 11 to be fed to the gate 43.

The control of the gate 43 is modified to take account of the fact that the first digit to be transferred is not necessarily recorded in sector I. When the flip-flop 44 is switched on as a result of operation of the switch 13, a gate 76 is rendered operative. This gate receives end of sector pulses from the head 4. These pulses pass through the gate 76 to the input of a four stage binary counter 77. The counter may be set to any desired value by application of a potential to the appropriate socket 78 of a matrix 79. This counter and matrix are similar to the counter 30 and the matrix 29. A plug connection 80 is made from the group of sockets 24 (FIGURE 1) which are to control transfer to the particular socket 78 which corresponds to the sector from which transfer is to commence. As in the case of the counter 30, this causes the counter 77 to be set forcibly to the complementary value. Consequently, the last stage of the counter generates a carry pulse at the start of the required sector.

The carry pulse from the counter 77 is utilised to switch on a flip-flop 81, which then holds open the gate 43. The output of the gate 43 is fed to a gate 82 which may receive a selected one of the clock pulse trains. The output from each of the clock gates 34 is fed to one of a group of selector gates 83/1 to 83/5. Each selector gate is provided with a control socket 84 which may be connected by a plug connection 85 to a group of sockets 24, to render the gate effective. Thus, as shown, the gate 83/3 will be effective.

If it is desired to start transfer from the track 11*a* with character position forty-seven, the plug connections 80 and 85 are so made that the flip-flop 81 is switched on by the counter 77 at sector II, that is, when the start of sector II reaches the head 11, and the gate 83/3 is operative. Thus the first signals appearing at the output of gate 82 will represent the forty-seventh character, which is recorded in the third storage locations of sector II.

The selection of the position in which the transferred character is recorded is determined by plugging to one of the sockets 26 to render effective a particular one of the heads 12 together with one of the clock pulse trains, in a similar way to that already described.

It will be assumed that the forty-seventh character is to be recorded in the twenty-fourth character position of track 12*a*, that is, in the fourth storage locations of sector IX. Head 12/8 is at the start of sector IX when head 11 is at the start of sector II, so that, the head 12/8 must be selected for recording under control of the fourth clock pulse train. This is effected by plugging from the socket 24 to the socket 26/25. The plugging would be made to socket 26/24 if the transfer were to start at sector I, to socket 26/26 if the transfer were to start at sector III, and so on.

The gate 31/8 and the gate 34/4 will be made operative by the plugging to socket 26/25 in a manner similar to that already described. The outputs from the gates 34 are commoned through isolating diodes 86 and are fed to the resetting input of the flip-flop 41 and the gate 33. In this example, the output signals from the gate 82 occur at the third clock pulse timing and the output from the clock gates is at the fourth clock pulse timing. Hence, each signal from gate 83 sets the flip-flop 41, which is reset one clock pulse interval later to produce a pulse which is fed through amplifier 42 to commoned inputs of the gates 31 and through gate 31/8 to the head 12/8.

In this way, the forty-seventh character from track 11*a* will be transferred to the twenty-fourth character position of track 12*a*. Similarly the forty-sixth, forty-fifth, etc., characters of track 11*a* will be transferred to the twenty-third, twenty-second, etc., character positions of track 12*a*. The transfer is terminated under control of the counter 30, in the manner already described. The output of the counter 30 is also used to reset the flip-flop 81.

No provision is made in the arrangement of FIGURE 5 for changing the clock pulse train from the selector gates 83 during a transfer. Hence, a single transfer operation must not include the passage of both sectors XVI and I past the head 11. This is not normally a practical disadvantage, but if desired, the selector gates may be controlled by a further shifting register in the same way as the register 36 controls the clock gates.

The counter 19 (FIGURES 1) allows a number of transfers to take place sequentially, one for each revolution of the drum 1. Consequently, the characters recorded in the track 11*a* may be re-assembled in any desired order on the track 12*a*. By providing gates, similar to the gate 46, for other tracks the data on the track 12*a* may be built up from characters transferred from several tracks. This facility for re-assembling data is particularly useful when the track 12*a* is sensed to control an output device, such as a printer, since it allows great flexibility of output format.

Although the arrangement described employs a magnetic drum as the storage device, it will be appreciated that other cyclically operable forms of storage, such as a disc or a loop of the magnetic tape, are equally suitable.

I claim:

1. Cyclically operable data storage apparatus with first and second data storage tracks for magnetically recorded signals, each track being divided into a plurality of character storage positions, including a first magnetic transducing head co-operating with the first track, a plurality of second magnetic transducing heads co-operating with the second track and spaced apart along it, first switching means connected to the second magnetic heads, signal gating means connecting the switching means to the first magnetic head, means for generating a plurality of differently timed timing pulse trains, second switching means for selectively applying the timing pulse trains to the gating means, and transfer control means adapted to operate the first and second switching means to complete a signal transfer path between a selected second magnetic head and the first magnetic head at a pre-determined timing to effect transfer of signals from a selected character position of one track to a selected character position of the other track.

2. Apparatus as claimed in claim 1, in which the character positions are grouped in sectors within a track and means are provided for timing the start of a transfer such that the first character of a group of characters which is transferred is recorded in a predetermined sector.

3. Apparatus as claimed in claim 2, in which means are provided for terminating a transfer after a pre-determined number of characters have been transferred.

4. Apparatus as claimed in claim 3, in which means are provided for generating a pulse for each sector passing the first head and in which the means for terminating the transfer includes a counter operable by said sector pulses, means for setting the counter to a value representative of the number of characters to be transferred and means responsive to the registration of a pre-determined value by the counter to terminate the transfer.

5. Apparatus as claimed in claim 1, in which a transfer operation may be preformed in each of a plurality of successive cycles and in which programming means are provided, the programming means being settable to control the character storage positions to and from which transfer is made on each cycle.

6. Apparatus as claimed in claim 5, in which the programming means includes a counter and means are provided for applying pulses to such counter to step it on once for each cycle.

7. Apparatus as claimed in claim 6, in which the programme counter controls a decoding matrix to effect sequential energisation of a plurality of output lines and manually adjustable connections are made to the output lines to complete circuits for controlling the successive transfer operations.

8. Apparatus as claimed in claim 2, in which the first switching means provides as many signal paths as there are sectors within a track and at least two of said paths are connected to the same magnetic head, a signal delay device, one path being connected directly to said head and the other path being connected through the signal delay device to said head, the delay device providing a delay equal to the time taken for one sector to pass said head.

9. Apparatus as claimed in claim 1, in which the data storage tracks are recorded on a magnetisable surface of a rotatable storage member and each track is divided into a plurality of sectors.

10. Apparatus as claimed in claim 9, in which there is a second magnetic head for each sector of the second track and each head is spaced from the next by a distance equal to the length of a sector.

11. Apparatus as claimed in claim 10, in which there are at least two character storage positions in each sector of the second track and successive characters are stored in character storage positions which occur in successive sectors, whereby the characters are arranged in a interleaved manner.

12. Apparatus as claimed in claim 11, in which reading or recording in a particular character storage position of the second track is effected by selection of one of the second magnetic heads in accordance with the sector in which that storage position is located, and by selection of one of the timing pulse trains in accordance with the location of that storage position within the sector.

13. Apparatus as claimed in claim 12, in which provision is made for transferring a pre-determined number of successive characters during a single transfer operation and for operating the second switching means to select a second one of the timing pulse trains when a predetermined sector passes the selected head during the transfer operation.

14. Apparatus as claimed in claim 13, in which the second switching means includes a gate for each timing pulse train, a shift register, each stage of the register controlling one of the gates, and means for setting each stage of the register individually to render operative a selected gate.

15. Apparatus as claimed in claim 14, in which one shifting register receives a shifting pulse from a control counter when it reaches a pre-determined value, the counter being settable to register any one of a number of different values in accordance with which head is selected and receiving an input pulse for each sector which passes the head.

16. Apparatus as claimed in claim 15, in which characters are transferred from the second track to the first track and in which the signal gating means includes first and second signal gates, the first gate being controlled jointly by said selected timing pulse train and the signal from the selected head and the second gate being controlled jointly by a control flip-flop and by the output of a flip-flop settable by the output from the first gate.

17. Apparatus as claimed in claim 16, in which the signal gating means includes a third signal gate which is controlled jointly by the signal from the selected head and said one of the timing pulse trains, the output of the third gate being applied to the second gate in common with the output of the flip-flop.

18. Apparatus as claimed in claim 17, in which the control flip-flop is adapted to render the second gate operative at the beginning of a transfer and to render it inoperative after a predetermined number of characters have been transferred.

19. Apparatus as claimed in claim 18, in which the state of the control flip-flop is determined by a counter settable in accordance with the number of characters to be transferred.

20. Apparatus as claimed in claim 15, in which characters are transferred from the first track to the second track, and in which a third switching means is provided for selecting a further one of the timing pulse trains.

21. Apparatus as claimed in claim 20, in which the signal gating means includes first and second signal gates, the first gate being controlled jointly by the signals from the first head and by a control flip-flop, and the second gate being controlled jointly by the output from the first gate and by said further selected timing train.

22. Apparatus as claimed in claim 21, in which the output of the second gate is applied in common to a third gate and to a setting input of a second flip-flop, and in which the selected timing pulse train is applied to the third gate and to a resetting input of the second flip-flop, the output of the third gate and the flip-flop being applied in common to the input of the first switching means.

23. Apparatus as claimed in claim 22, in which the control flip-flop is adapted to render the first gate operative at a time in the cycle determined by the first character which is to be transferred and to render the gate inoperative after a predetermined number of characters have been transferred.

24. Apparatus as claimed in claim 23, in which the state of the control flip-flop is controlled by two counters which are settable, respectively, in accordance with the first character to be transferred and the number of characters to be transferred.

25. Apparatus as claimed in claim 1, in which the first and second tracks are on a magnetisable surface which also carries further tracks containing recorded signals adapted to generate the timing pulse trains.

26. Apparatus as claimed in claim 1, in which the first and second tracks each comprise a plurality of successively arranged sectors and each sector comprises a plurality of successively arranged sub-sectors, each of which provides a plurality of signal storage locations, and in which each character is represented by signals in combinational code form, successive characters being recorded in successive sectors and the code signals of each character being recorded in corresponding storage locations of the successive sub-sectors of a sector.

27. Data storage apparatus comprising a rotatable drum having first and second storage tracks for the recording of signals thereon, a transferee transducer head arranged to write on said first track, characters in the signals recorded on the second track being positioned in track sectors and the signals of two or more characters recorded in the same track sector forming an interlaced pattern, a plurality of transferor transducer heads spaced along the second track and arranged to permit each of the transferor heads to read a different sector when the drum is rotated, selector means for passing only the signals derived from the selected one of the transferor heads, means for generating a plurality of timing pulse trains, each of the pulse trains being shifted in phase from every other pulse train, means for selecting one of the timing pulse trains, and gating means controlled by the selected timing pulse train for causing gated signals from the selected transferor head to be impressed upon the transferee head.

References Cited in the file of this patent

UNITED STATES PATENTS

| | | |
|---|---|---|
| 2,680,239 | Daniels | June 1, 1954 |
| 2,770,797 | Hamilton et al. | Nov. 13, 1956 |
| 2,832,064 | Lubkin | Apr. 22, 1958 |
| 2,845,609 | Newman et al. | July 29, 1958 |
| 2,876,437 | Johnson | Mar. 3, 1959 |
| 2,935,734 | Donan et al. | May 3, 1960 |
| 2,939,110 | Beattie et al. | May 31, 1960 |

FOREIGN PATENTS

| | | |
|---|---|---|
| 167,102 | Australia | Feb. 27, 1956 |
| 745,614 | Great Britain | Feb. 29, 1956 |